United States Patent
Sibal et al.

(10) Patent No.: US 7,289,606 B2
(45) Date of Patent: Oct. 30, 2007

(54) MODE-SWAPPING IN MULTI-MODAL TELEPHONIC APPLICATIONS

(76) Inventors: Sandeep Sibal, 228 Country Club La., Scotch Plains, NJ (US) 07076; Inderpal Singh Mumick, 85 Swenson Cir., Berkeley Heights, NJ (US) 07922

( * ) Notice: Subject to any disclaimer, the term of this patent is extended or adjusted under 35 U.S.C. 154(b) by 0 days.

(21) Appl. No.: 10/119,614

(22) Filed: Apr. 10, 2002

(65) Prior Publication Data

US 2003/0063728 A1    Apr. 3, 2003

Related U.S. Application Data

(60) Provisional application No. 60/326,304, filed on Oct. 1, 2001.

(51) Int. Cl.
*H04M 11/00* (2006.01)
(52) U.S. Cl. .................. 379/52; 379/93.09; 379/93.17; 379/207.02
(58) Field of Classification Search ................. 379/52, 379/93.09, 93.17, 207.02
See application file for complete search history.

(56) References Cited

U.S. PATENT DOCUMENTS

| | | | |
|---|---|---|---|
| 5,828,468 A | 10/1998 | Lee et al. ................... 358/434 |
| 5,844,979 A | 12/1998 | Raniere et al. ........ 379/202.01 |
| 6,349,132 B1 * | 2/2002 | Wesemann et al. ....... 379/88.17 |
| 6,366,578 B1 | 4/2002 | Johnson ....................... 370/353 |
| 6,570,966 B1 * | 5/2003 | Freeman et al. ......... 379/93.08 |
| 2002/0194388 A1 * | 12/2002 | Boloker et al. ............. 709/310 |

* cited by examiner

*Primary Examiner*—Ahmad F. Matar
*Assistant Examiner*—Karen Le
(74) *Attorney, Agent, or Firm*—Ash Tankha; Counsel, Lipton Weinberger & Husick

(57) ABSTRACT

Multi-modal applications are capable of interacting with a user in a voice mode, a visual mode, and/or other modes of communication. Mode swapping refers to the process of changing from one mode of communication (or one combination of modes) to another. Mode swapping may be initiated by a user, by an application, or by another entity. Mode swapping may be performed "adaptively," in that an entity monitors the effectiveness of a communication mode and initiates a mode swap if communication is proceeding non-optimally in the current mode. Mode swapping may be performed by dropping a call to a telephone terminal in the currently-open mode and placing a call to that same device in another mode. In one embodiment, logic for mode swapping resides on a gateway proxy that mediates communication between an application and a telephone terminal.

23 Claims, 3 Drawing Sheets

US 7,289,606 B2

MODE-SWAPPING IN MULTI-MODAL TELEPHONIC APPLICATIONS

CROSS-REFERENCE TO RELATED CASES

This application claims the benefit of U.S. Provisional Application Ser. No. 60/326,304, entitled "Mode-Swapping in Multi-Modal Telephonic Applications," filed Oct. 1, 2001.

FIELD OF THE INVENTION

The present invention relates generally to the field of telephony. More particularly, the invention relates to applications that interact in two or more modes (e.g., voice and data modes) with a user through a telephone terminal, and to the changing of modes during usage of such an application.

BACKGROUND OF THE INVENTION

Traditionally, computers and telephones have been viewed as separate and distinct devices. In the traditional view, a computer is a tool for manipulating and storing data, while the telephone is a tool for engaging in audio communications. As computers become smaller, however, the distinction between computers and telephones has become blurred. Most telephones include some computing capability, and most computers include some communications capability.

The inclusion of computing capability in a telephone allows the telephone to act in what can be viewed as two "modes"—i.e., a voice mode and a data or "visual" mode. In the voice mode, the user of the telephone engages in two-way voice communication with another party (where the other party may, in fact, be a computer rather than a person). In the data/visual mode, the user enters data on a keypad and receives data in such a manner that it can be viewed on the telephone's visual display. At present, most software applications for telephony interact with the telephone in a single mode—i.e., the telephone user may use voice mode or data/visual mode, but generally not both at the same time. As telephones evolve to include more computing and data processing capability, it can be expected that applications will correspondingly evolve to permit a user to interact with the application by switching back and forth between voice and data modes (or by adding and dropping modes in environments that permit the use of two or more modes simultaneously). Such applications need the support of an infrastructure that facilitates such "mode swapping."

In view of the foregoing, there is a need for a system that supports such mode swapping, which has not been realized in the prior art.

SUMMARY OF THE INVENTION

The present invention provides techniques for mode swapping. In accordance with the invention, a telephone may engage in communications in two or more "modes." These "modes" are exemplified by a voice mode where the user engages in two-way voice communications with another party, and a data (or "visual") mode where the user engages in interactive data communication with another party by entering data on an input device (such as a keypad) and viewing data on a display (such as a miniature Liquid Crystal Display (LCD)). Such a telephone may, in some instances, permit the user to engage in two (or more than two) modes of communication concurrently. Alternatively, such a telephone may restrict the user to using one mode at a time, while permitting the mode to be changed during the course of a communication. The "swapping" of modes refers to the changing from one mode to another (or from one combination of modes to another). In a typical scenario, the telephone is operated by a person, and the "other party" with which the person communicates through the telephone is a software application, such as a menu system for a bank or airline, or a web site on the "wireless web."

In a telephone that has data and voice modes (which is exemplary, and not limiting of an environment in which mode swapping may be performed), mode swapping may occur in the following configurations: Data to voice, voice to data, combined data/voice to data only, combined data/voice to voice only, voice only to combined data/voice, and data only to combined data/voice com. (In the case where the telephone does not permit two modes to be used simultaneously, only the first two of the above-listed cases is possible.) Another variation on the above-listed modes is data/voice-input mode, in which the user can use data mode for both input and output, but can only use voice mode for input (e.g., if the user does not want to disturb people with the audible sound of voice output mode, but still wishes to be able to provide input using voice). In this case, the mode swaps may also include, for example, combined data/voice to combined data/voice-input, as well as combined data/voice-input.

Mode swapping may be initiated in a variety of ways: for example, the user may initiate a mode swap (e.g., by pushing a button on the telephone), the application with which the user is interacting may initiate the mode swap (e.g., by sending an instruction to the telephone), or the network in which the telephone communicates may have a component that mediates interaction between the application and the telephone and which initiates a mode swap independently of the user or application.

Typical telephones (particularly wireless telephones) communicate data and voice through different channels. Changing modes may be performed by dropping one channel and adding another—e.g., a change from voice to data may be accomplished by dropping the voice circuit over which voice is being carried and establishing a data channel.

A user's interaction with an application, in many cases, requires one or more browsers. For example, the user may be interacting with "wireless web" content in either Voice extensible Markup Language (VXML) format or Wireless Markup Language (WML) format. Interaction with VXML content is generally performed by engaging in voice communication with a voice browser that runs on a central server, and interaction with WML content is generally performed with a visual browser that runs on the user's telephone. In order to swap modes during a conversation, it may be necessary to bring one of the browsers to the place in the content to which the user had navigated using the other browser—e.g., if the user navigates to a particular WML page in data mode using a visual browser and then switches to voice mode, continuity in the communication can be achieved by bringing the voice browser to the same (or equivalent) VXML page to which the visual browser is pointing at the time of the mode swap. This can be achieved by synchronizing the voice browser to the same "state" that exists in the visual browser at the time that the mode swap occurs. It will be understood that VXML and WML are merely examples of markup languages, and the invention applies to any markup language. Moreover, it will be understood that a markup language is merely one way of interacting with an application, and the invention applies to any software application, whether or not such application employs a markup language.

Other features of the invention are described below.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF THE INVENTION

The present invention provides techniques for mode swapping, and an environment in which mode swapping may occur. In accordance with the invention, a user may interact with a software application (or other content provider) in various different "modes" (e.g., voice mode, data mode, etc.). During such interaction, the user may switch from one mode to another, or may drop or add a mode (in the case where it is possible to use more than one mode concurrently), while continuing to interact with the same content. The mode swap may be initiated by the user, by the application that provides the content, or by a separate component that mediates communication between the user and the application.

Overview of Telephony Architecture

Figure 1:
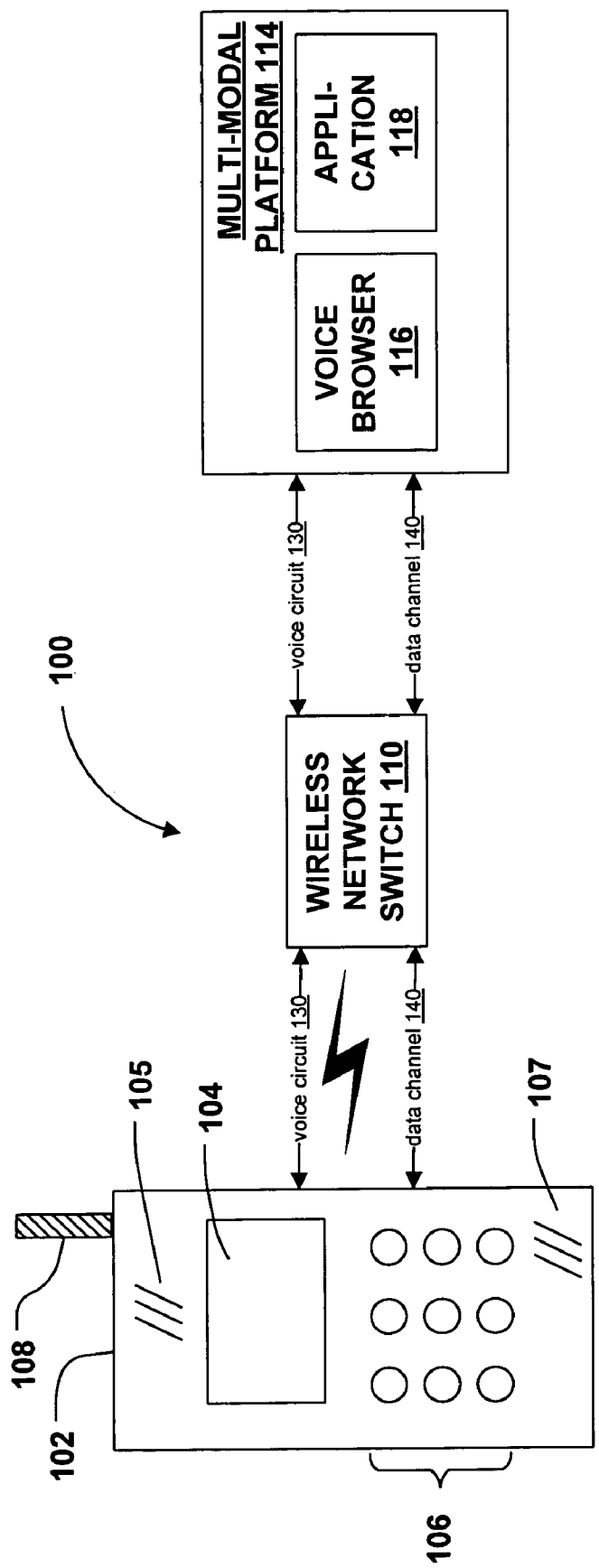
FIG. 1 is a block diagram of a first exemplary telephone network architecture in which aspects of the invention may be implemented.

FIG. 1 shows a telephone network architecture 100, in which aspects of the invention may be implemented or deployed. Architecture 100 includes a wireless telephone 102, a wireless network switch 110, and a multi-modal platform 114. While architecture 100 is shown, for exemplary purposes only, in the context of wireless telephony, it will be appreciated that the invention applies to any type of telephony or communications architecture including (but not limited to) wired telephony.

In a preferred embodiment, wireless telephone 102 comprises a visual display 104, an audio speaker 105, a keypad 106, a microphone 107, and an antenna 108. Visual display 104 may, for example, be a Liquid Crystal Display (LCD) which displays text and graphics. Audio speaker 105 renders audio signals (e.g., signals received from other components in architecture 100) in order to produce audible sound. Keypad 106 may be an alpha-numeric keypad that allows a user to input alpha-numeric characters. Depending upon context, wireless telephone 102 may respond to input from keypad 106 by displaying appropriate characters on display 104, transmitting ASCII representations of such characters, or (in the case of numeric input) generating appropriate Dual Tone Multi-Frequency (DTMF) signals. Microphone 107 captures audio signals, which may, in one example, be digitally sampled by wireless telephone 102 for wireless transmission to other components of network architecture 100. Antenna 108 is used by wireless telephone 102 to transmit information to, and receive information from, components within architecture 100. For example, wireless telephone 102 may use antenna 108 to receive digital audio signals for rendering on speaker 105, to transmit digital audio signals captured by microphone 107, to receive data to be displayed on visual display 104, or to transmit data captured by keypad 106. Wireless telephone 102 may also contain computing components (not shown). For example, wireless telephone 102 may have a memory and a processor, which may be used to store and execute software (e.g., software that digitally samples audio signals captured with microphone 107, software that generates analog audio signals from digitally-sampled audio received through antenna 108, a WAP browser that enables the browsing of content using visual display 104 and keypad 106, etc.). The structure of a wireless telephone 102 that employs the components shown in FIG. 1 in connection with a memory and processor will be apparent to those of skill in the art, and thus is not discussed at length herein.

One feature of wireless telephone 102 is that it can be viewed as having two different "modes" of communication. On the one hand, wireless telephone 102 communicates in a "voice" mode; on the other hand, wireless telephone 102 communicates in a data (or "visual") mode. In voice mode, wireless telephone uses microphone 107 to capture audio (which may be digitally sampled and then transmitted through antenna 108), and uses speaker 105 to render audio (which may be received through antenna 108 in a digital form). "Voice" mode is exemplified by the conventional usage of a telephone in which a first party uses the telephone to engage in two-way speech with another party. In "visual" mode, wireless telephone uses keypad 106 to capture data (e.g., alpha-numeric data which may be represented in ASCII form), and uses visual display 104 to render data. The captured data may be transmitted through antenna 108, and antenna 108 may also be used to receive the data that is to be displayed on visual display 104.

Wireless telephone 102 communicates with a wireless network switch 110. Wireless network switch is coupled to a tower (not shown) that engages in two-way communication with wireless telephone 102 through antenna 108. Wireless network switch 110 connects wireless telephone 102 to various components, such as multi-modal platform 114, which is described in greater detail below.

Overview of Multi-Modality

In a typical communications network (e.g., a 2G network), it is possible to communicate with wireless telephone 102 using both voice and data (but not necessarily at the same time). In general, voice communication between wireless telephone 102 and another party on the network takes place over voice circuit 130. (In the example of FIG. 1, the "other party" is multi-modal platform 114, which acts as a participant in a voice or data conversation with the user of wireless telephone 102.) Data communication, on the other hand, generally takes place through data channel 140. There may be technical differences between voice circuit 130 and data channel 140. For example, voice circuit 130 may represent dedicated bandwidth between multi-modal platform 114 and wireless telephone 102, whereas data channel 140 may not. Additionally, the protocols for voice and data transmission may be different, such that packets of digital voice transmitted over voice circuit 130 may have formats that differ from the data packets transmitted over data channel 140. In some cases, wireless telephone 102 (as well as the network architecture 100 in which wireless telephone 102 participates) may be able to keep voice circuit 130 and data channel 140 open simultaneously (such as in a 2.5G architecture). In other cases, either the telephone or the network may lack support for such simultaneity. In many cases, mode swapping may comprises closing voice circuit 130 and opening data channel 140 (or vice versa).

Multi-modal platform 114 exemplifies a computing component that provides multi-modal content—i.e., content that can be delivered and/or interacted with in more than one mode. Multi-modal platform 114 may be a computing device on which software can execute, and in the example of FIG. 1, application 118 and voice browser 116 execute on multi-modal platform 114. Application 118 may provide some type of content. For example, application 118 may be an electronic retailer, a banking system, an airline reservation system, a service that provides driving directions, etc. Application 118 provides its content in both voice and visual forms. For example, application 118 may generate content in both WML and VXML depending on whether the user is in the visual or voice mode. Alternatively, application 118 may generate content in some mode-agnostic format (e.g., a multi-modal markup language), and multi-modal platform 114 may convert the content to a voice or visual form as appropriate.

Multi-modal platform 114 communicates content generated by application 118 to wireless telephone 102 in either voice or visual mode (or in both modes at the same time, if the environment supports concurrent use of more than one mode). If communication with wireless telephone 102 is in voice mode, then application 118 communicates content to voice browser 116. Voice browser 116, in turn, renders the content as audio signals and sends the audio to wireless telephone 102 over voice circuit 130. Similarly, voice browser receives audio from wireless telephone over voice circuit 130 (e.g., the user's spoken voice, or Dual Tone Multi Frequency (DTMF) signals generated by keypad 106), interprets the received audio, and sends information to application 118 based on the received and interpreted audio. In this manner, voice browser 116 provides a voice interface to application 118 by allowing a user of wireless telephone 102 to communicate with application 118 using voice.

Similarly, if communication with wireless telephone 102 is in visual mode, then application 118 communicates content to wireless telephone 102 over data channel 140. Typically, the browser that facilitates user interaction with visual-mode content (e.g., a WAP browser that executes on wireless telephone 102) is located on wireless telephone 102. Thus, in a typical visual mode scenario, visual content is provided to a visual browser on wireless telephone 102, which then renders the content on visual display 104, and permits the user to interact with the content using keypad 106. If the user enters data in the course of interacting with the content, this data may be sent back to application 118 over data channel 140.

As noted above, visual and voice modes can be used at the same time if the use of two modes concurrently is supported by the environment in which wireless telephone 102 operates. For example, application 118 may generate both visual and voice content, and communication of this content to wireless telephone 102 may take place concurrently over voice circuit 130 and data channel 140.

Mode Swapping

In some cases, it may be necessary or desirable to swap modes—that is, to change from one mode (or combination of modes) to another. As noted above, one example of a multi-modal environment is an environment that supports both voice and visual modes (although a multi-modal environment may support any number of modes, which need not be voice and visual modes). In such an exemplary two-mode environment, the possible mode swaps are:
 Visual to voice
 Voice to visual
 Combined visual/voice to visual only
 Combined visual/voice to voice only
 Visual only to combined visual/voice
 Voice only to combined visual/voice Another mode that may exist is "combined visual/voice-input" mode, which is a variant of combined visual/voice mode. Combined visual/voice-input mode allows a user of wireless telephone 102 to interact with multi-modal content in both visual and voice modes, such that the user can both provide input and receive output in visual mode, but can only provide input in voice mode. This addresses the case where the user may wish to avoid disturbing others around him by disengaging the audio output, while still preserving the user's ability to provide voice input. Thus, all output will be provided in visual form, while the user may still speak an occasional command into wireless telephone 102. Where combined visual/voice-input mode exists, the mode swaps may also include:
 Combined visual/voice to combined visual/voice-input
 Combined visual/voice-input to combined visual/voice The above mode swaps represent the most "natural" use of combined visual/voice-input mode—i.e., as a transition to or from combined visual/voice mode. This is a "natural" use of combined visual/voice-input mode because the user is already combining visual and voice, and is simply turning the voice-output on or off. However, it should be understood that the above-listed mode swaps involving combined visual/voice-input mode are not limiting of the invention; rather, one may swap to or from combined visual/voice-input mode from any other mode. Additionally, it should be understood that this transition may involve augmenting communication in visual mode with some of the information that would have been sent to the device in voice mode if voice-output had not been discontinued. For example, if the user was receiving an image of a map in visual mode and spoken directions at the time that voice-output is dropped, then the visual communication may be augmented by printing the directions that would otherwise have been spoken.

Preferably, a mode swap of any type produces a seamless transition that continues the user's interaction with the content from the same logical location within the content at which the user was interacting with the content prior to the mode swap. For example, if a user is listening to a voice menu in voice mode and then switches to visual mode, then the same menu may be rendered visually following the mode swap. If the user is entering data in visual mode and then switches to voice mode, then a voice prompt requesting that the user speak that data into microphone 107 may be rendered.

Mode swapping may be initiated in a number of ways. In general, initiation of mode swapping may be divided into three categories: (1) user-initiated mode swapping; (2) application-initiated mode swapping; and (3) mode swapping initiated by an entity other than the user or the application.

In user-initiated mode swapping, the user of wireless telephone 102 uses some type of control to direct a mode swap to occur. As one example, the user may perform a voice-to-visual mode swap by pressing a button on wireless telephone 102. As another example, a user may perform a visual-to-voice mode swap by clicking on a wtai link in the visual browser. Similar scenarios are possible for other types of mode swaps.

In application-initiated mode swapping, the mode swap is performed upon receipt of an instruction generated by the application. For example, an application may initiate a voice-to-visual mode swap by instructing wireless telephone 102 to start its visual browser and to load a particular WML page. An application may also initiate a data-to-voice mode swap by instructing wireless telephone 102 to shut down its visual browser and instructing voice browser 116 to render a particular VXML page. An application may initiate other types of mode swapping by issuing appropriate instructions.

Application-initiated mode swapping may be performed based on deterministic rules, or "adaptively" based on external conditions. In the case of deterministic rules, application 118 (or another component that mediates communication between application 118 and wireless telephone 102) may have a set of rules that specify which mode to use under a given set of circumstances. Examples of such rules are: all menus are to be displayed in visual mode; use visual mode as the default unless the user has specified another preference; provide all data to wireless telephone 102 in visual mode and switch to voice mode to receive the response; etc.

In the case of "adaptive" mode swapping, application 118 (or a component that mediates communication between application 118 and wireless telephone 102), the current mode may be determined dynamically based on existing conditions. For example, if communication is occurring in voice mode and the voice recognition system is having difficulty recognizing the user's speech (e.g., because of the user's accent, because of a bad connection, etc.), a mode swap to visual mode can be executed. Preferably, adaptive mode swapping can be overridden by the user.

Mechanics of a Mode Swap

The following is a non-exhaustive list of ways in which a mode swap may be performed. As one example, a mode swap may be performed by multi-modal platform 114's dropping a call in the current mode and placing a call to wireless telephone 102 in the other mode. In the case where it is possible to use more than one mode concurrently and communication is currently proceeding in two modes, a mode swap that results in dropping one of the modes may be executed by multi-modal platform 114's dropping one of the calls to wireless telephone 102. Conversely, in the case where communication is currently proceeding in one mode and a mode is to be added, multi-modal platform 114 may add a call. This dropping and adding of calls can be performed by exploiting the features available in an existing Signaling System 7 (SS7) network, and does not require modification to a conventional wireless telephone, such as wireless telephone 102. If modifications to wireless telephone 102 can be made, then other approaches to mode swaps are possible.

Upon execution of the mode swap, the browser that is to enter the communication is preferably initialized to an appropriate state—i.e., the state that was achieved by user interaction prior to the mode swap. For example, if the user is browsing VXML pages in the wireless web in voice mode and then switches to (or adds) data mode, the visual browser should be pointed to a WML page that is equivalent to the VXML page to which the user has most recently navigated. Additional refinements on this process are possible—e.g., initializing the visual browser to a particular card within a page, or pointing the cursor to a particular data-entry prompt within a card. (In the case where the current mode is combined visual/voice and the mode swap results in dropping one of the modes, it is not necessary to initialize a browser to an appropriate state, since no new browser is entering an existing "conversation.") Initialization of the browser may be accomplished in a variety of ways. For example, the browsers may be configured such that, upon initialization, the most recent state of application 118 is automatically internalized and the appropriate page or card is loaded; this technique is advantageous, but requires that browsers be modified to accommodate the execution of mode swaps in this manner. Alternatively, the state can be internalized in a way that does not require modification of the browsers by incorporating into multi-modal platform 114 logic that loads the state into the appropriate browser by mechanisms that existing browsers support (e.g., cookies, DOM-level state update, etc.), or by providing sufficient data that the browser can emulate past user interactions in order to place itself in the correct state.

Environment-Supported Mode Swapping

Figure 2:
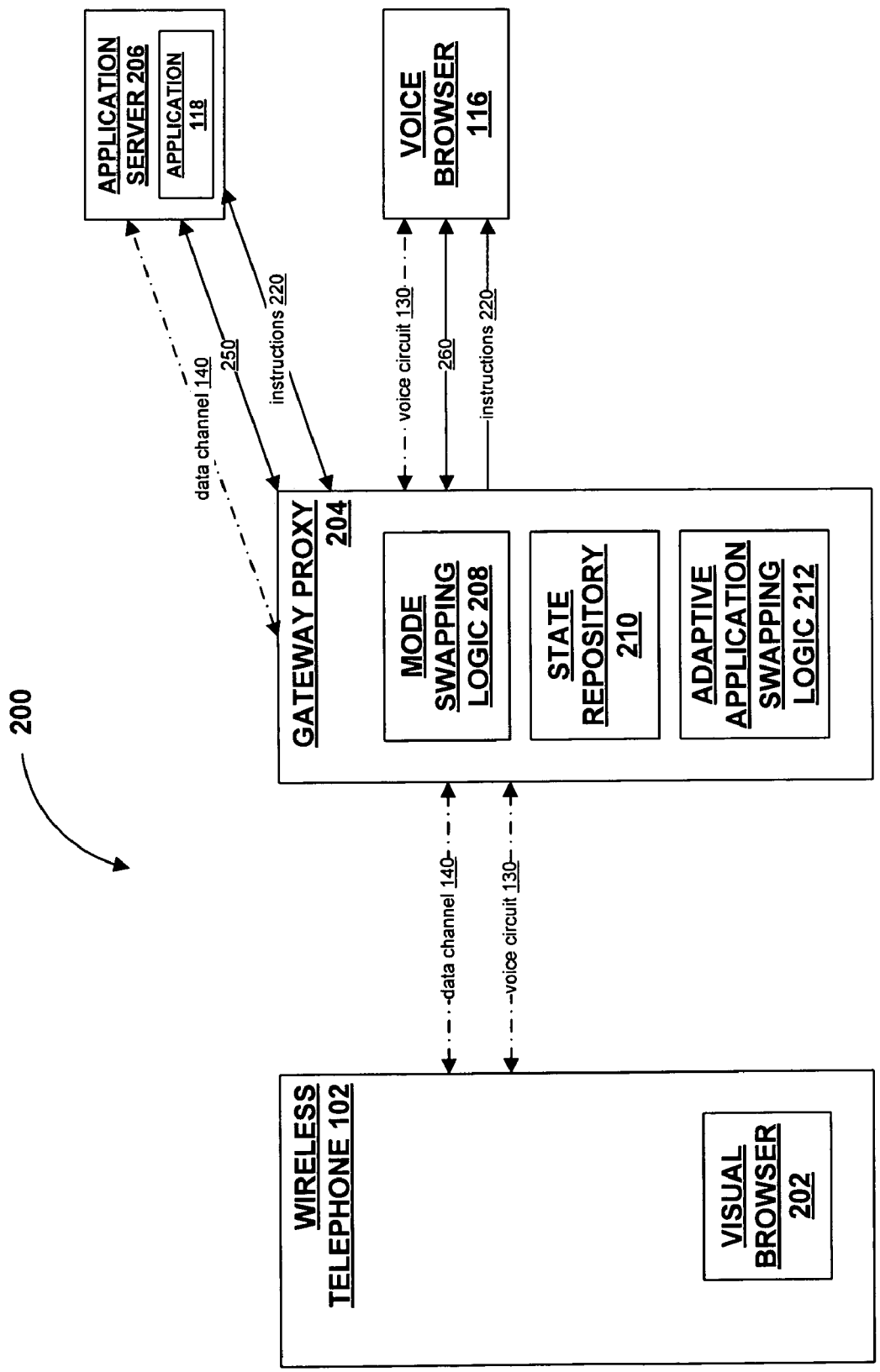
FIG. 2 is a block diagram of a second exemplary telephone network architecture in which aspects of the invention may be implemented.

FIG. 2 shows an architecture 200 in which mode swapping may take place. As noted above, several mode swapping functions may be performed by a component that mediates communication between wireless telephone 102 and application 118. Architecture 200 includes a gateway proxy 204 that performs such mediation.

Architecture 200 includes wireless telephone 102. Visual browser 202 (e.g., a WAP browser) executes on wireless telephone 102. Application server 206 is a computing device that executes application 118. As described above, application 118 is an application that generates content with which a user can interact in either a voice mode, a visual mode, or some combination of those modes. Voice browser 116 renders audio signals based on content generated by application 118, and also provides information to application 118 based on audio received from wireless telephone 102.

Application 118 communicates with wireless telephone 102 in the visual mode by sending data to, and receiving data from, wireless telephone 102 through gateway proxy 204. The data destined for wireless telephone 102 is data that can be rendered on visual browser 202. The data received from wireless telephone 102 is data captured on wireless telephone 102 as the user interacts visual browser 202 (e.g., data entered on keypad 106). In essence, data channel 140 exists between wireless telephone 102 and application server 206 through gateway proxy 204.

Application 118 communicates with wireless telephone 102 in the voice mode by sending audibly-renderable content to voice browser 116, and by receiving information from voice browser 116 that voice browser distills from audio that voice browser 116 receives from wireless telephone 102. For example, application 118 may send voice browser 116 a VXML page, which can be audibly rendered by voice browser 116; similarly, voice browser 116 may receive speech or DTMF from wireless telephone and "distill" this speech or DTMF into data that it sends to application 118. In essence, application 118 communicates raw data back-and-forth with voice browser 116, and voice browser 116 maintains a voice circuit 130 with wireless telephone 102 to relay this data in an audible form.

It should be noted that in the example of FIG. 2, application 118 and voice browser 116 are de-coupled—that is, they are separate components that may not exist on the same machine. Alternatively, voice browser 116 could execute on either gateway proxy 204 or on application server 206, but it should be understood from FIG. 2 that application 118, voice browser 116, and gateway proxy 204 are conceptually separate components.

Gateway proxy 204 preferably includes mode swapping logic 208, state repository 210, and adaptive mode swapping logic 212. Mode swapping logic 208 is a set of executable instructions that causes gateway proxy 204 to perform the mechanics of a mode swap, once such a mode swap has been initiated. As discussed above, this mode swap may be performed by placing a call in one mode and dropping a call in another mode. As also noted above, the mode swap may be initiated by the user, the application, or by another component (see adaptive mode swapping logic 212, described below). Mode swapping logic 208 performs the mechanics of the mode swap, regardless of how the mode swap was initiated.

State repository 210 maintains information about the state of navigation through content—e.g., the particular page or card at which the user is navigating. The state information can be communicated either to voice browser 116 or visual browser 202 at the time of a mode swap, such that the appropriate browser can point to the appropriate logical location in the content upon execution of a mode swap.

Adaptive mode swapping logic 212 is a set of executable instructions that analyzes current conditions and determines whether to perform a mode swap based on those conditions. For example, adaptive mode swapping logic 212 may analyze whether voice recognition is working properly, and initiate a change from voice to visual mode if the voice recognition is not working. Essentially, adaptive mode swapping logic 212 is a component that can initiate a mode swap to be performed by mode swapping logic 208.

Gateway proxy 204 is in two-way communication with application server 206 (reference numeral 250), and also with voice browser 116 (reference numeral 260). This two way communication allows gateway proxy 204 to act as a pass-through for data channel 140 and voice circuit 130. Such two-way communication also allows gateway proxy to send and receive instructions to the various components. For example, if the user (or adaptive mode swapping logic 212) initiates a mode swap, gateway proxy 204 sends an instruction to voice browser to shut down, and/or sends an instruction to application 118 to stop providing content in voice mode. Similarly, if application 118 initiates a mode swap, it sends an instruction to gateway proxy 204 in order to instruct it to use mode swapping logic 208 to perform the mode swap. As another example, when adaptive mode swapping logic 212 initiates a mode swap, it may await an instruction from application 118 to proceed, since application 118 may have the ability to override an adaptive mode swap.

It should be observed that architecture 200 is advantageous in that it provides a general mode-swapping infrastructure for applications, such that the applications (or the platforms on which they run) need not provide their own mode swapping facilities.

Exemplary Mode-Swapping Process

Figure 3:
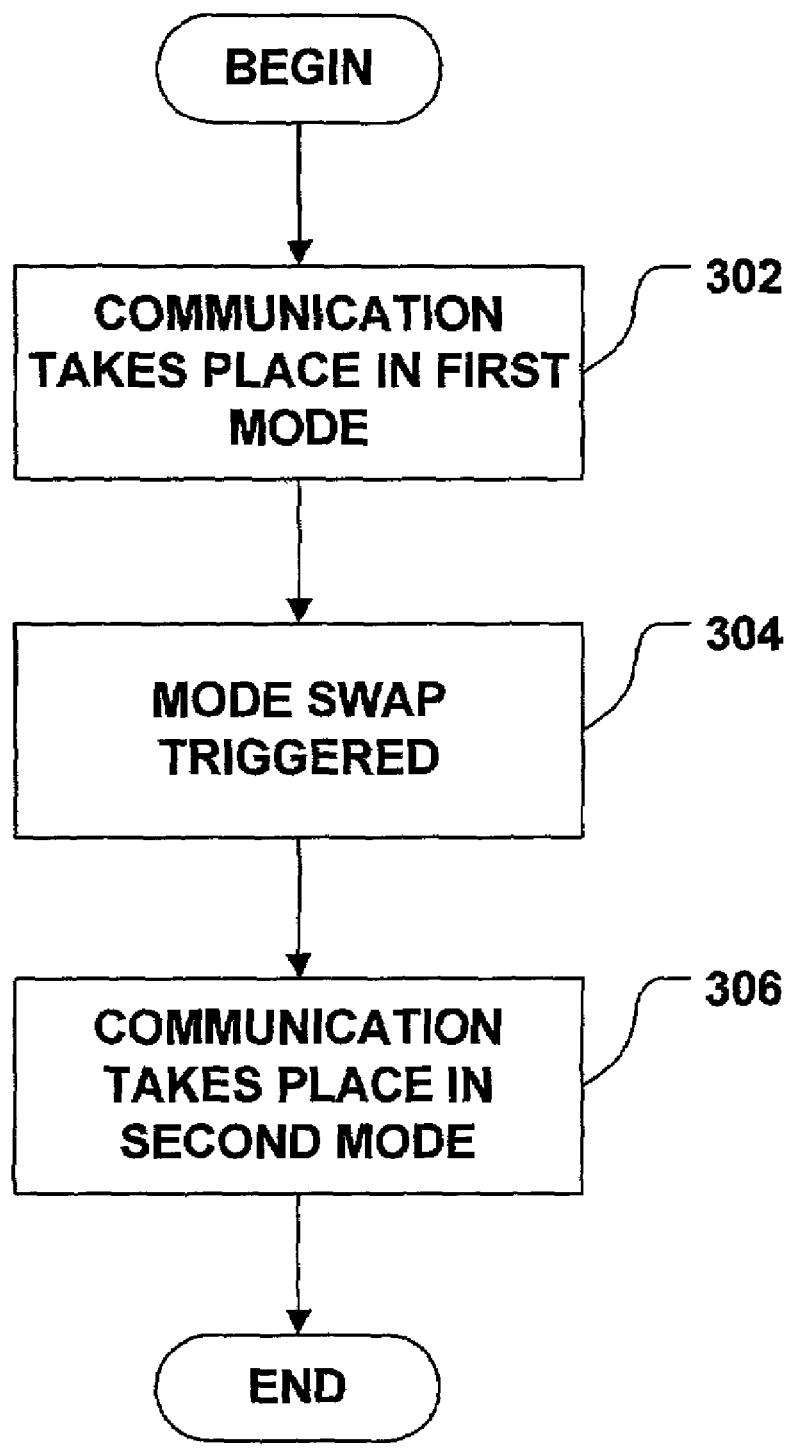
FIG. 3 is a flow chart of an exemplary process for mode swapping.

FIG. 3 shows an exemplary process of performing a mode swap. At step 302, communication between a device and an application takes place in a first mode. This "first mode" may, for example, be a visual (or data) mode, a voice mode, a combined visual/voice mode, a combined visual/voice-input mode, etc.

At step 304, a mode swap is triggered. What triggers the mode swap may depend on the circumstances and/or environment in which communication takes place. For example, a mode swap may be triggered by the user (e.g., by the user pressing a button on the device, by the user clicking a wtai link on a card displayed by the device, etc.); by the application (e.g., the application determines that the mode should change and initiates the mode swap); or by an entity other than the application (e.g., gateway 204, as described above).

At step 306, communication between the device and the application proceeds in a second mode. Examples of the various mode swaps (e.g., visual to voice, combined visual/voice to combined visual/voice-input, etc.) are listed above.

It is noted that the foregoing examples have been provided merely for the purpose of explanation and are in no way to be construed as limiting of the present invention. While the invention has been described with reference to various embodiments, it is understood that the words which have been used herein are words of description and illustration, rather than words of limitations. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

What is claimed is:

1. A method of swapping between a first mode of communication and a second mode of communication, wherein an application and a user communicate through a telephone in said first and second modes of communication, the communication being in a first mode, wherein a first browser facilitates communication with application in the first mode, and a second browser facilitates communication with application in the second mode, the method comprising:
    generating an instruction to perform a change of mode;
    adding the second mode to the communication while maintaining simultaneous use of the first mode of communication, wherein at the instant of adding the second browser, the second browser is not yet synchronized to the state of the first browser;
    synchronizing the second browser to a state of the first browser, further comprising the steps of:
    maintaining state information of said first browser and said second browser;
    receiving said maintained state information of first browser at the second browser; and
    initializing the second browser to the state of the first browser;
    whereby the first browser and the second browser are not required to be concurrently in the same updated state in all points in time during communication.

2. The method of claim 1, wherein said instruction is generated by the application.

3. The method of claim 1, wherein said instruction is generated by the user.

4. The method of claim 1, wherein said instruction is generated by an entity different from the application and different from the user.

5. The method of claim 1, wherein one of the modes comprises a data mode which enables the user to receive input visually and to provide input tactilely, and wherein the other of the modes comprises a voice mode which enables the user to receive input audibly and to provide audible input.

6. The method of claim 1, wherein the act of adding the second mode comprises placing a call to the telephone.

7. The method of claim 1, further comprising: dropping an existing call to the telephone while maintaining communication between the telephone and the application in at least one of the modes.

8. The method of claim 1, wherein the first mode comprises a voice mode, and wherein the method further comprises:
  detecting that there is a difficulty in deciphering the user's speech; and
  generating the instruction in response to said detecting step.

9. A gateway proxy for mode swapping between a first mode of communication and a second mode of communication between a telephone operated by a user and an application, wherein a first browser is used for conducting said first mode of communication and a second browser is used for conducting said second mode of communication, said gateway proxy comprising:
  a swapping logic for opening and closing said first mode connection and said second mode connection in accordance with a mode instruction, wherein said mode instruction can cause to be enabled any of the following: a second mode only connection; a first mode only connection; and a simultaneous first mode and second mode connection, wherein the first mode and second mode connections are synchronized upon in addition of one of the (i) second mode connection and (ii) the first mode connection to the simultaneous second mode and first mode connection;
  a state repository for maintaining information about state of navigation in the application;
  an adaptive mode swapping logic for analyzing current conditions and determining whether to perform a mode swap based on said conditions.

10. The gateway proxy of claim 9, wherein said swapping logic receives said instruction from said telephone.

11. The gateway proxy of claim 9, wherein said swapping logic receives said instruction from said application.

12. The gateway proxy of claim 9, wherein said swapping logic opens at least one of the connections by placing a call to said telephone, and wherein said logic closes at least one of the connections by dropping a call to said telephone.

13. The gateway proxy of claim 9, wherein said swapping logic is adapted to open and close said voice connection separately for input and output, wherein said logic receives an instruction to discontinue output to said telephone, and wherein said logic closes the output of said voice connection in response to the received instruction.

14. A method of interacting with a device, wherein said device is in communication with an application, and wherein said device is capable of communicating in both: (1) a voice mode which receives audio input and provides audio output, and (2) a visual mode which receives non-audible input and provides visual output, wherein a voice browser facilitates communication with said application in the voice mode, and wherein a visual browser facilitates communication with the application in the visual mode, the method comprising:
  interacting with the device in the voice mode, including receiving information from the device in the voice mode, but without sending information to the device in voice the mode;
  adding the visual mode to the communication while maintaining simultaneous use of the voice mode from the communication;
  interacting with the device in visual mode concurrently with voice mode wherein data is received in the visual mode concurrently with the audio in the voice mode; and
  upon adding the visual mode to the communication, synchronizing the visual browser to a state of voice browser.

15. The method of claim 14, further comprising: discontinuing the sending of information to the device in voice mode.

16. The method of claim 15, wherein the discontinuance is in response to a user instruction.

17. The method of claim 15, further comprising:
  augmenting the interaction with the device in visual mode to include information that would be sent to the device in voice mode if the sending of information to the device in voice mode had not been discontinued.

18. A method of performing a communication between an application and a user using a mobile telephone having multiple communication modes, wherein a voice browser facilitates communication with said application in the voice mode, and wherein a visual browser facilitates communication with the application in the visual mode, the method comprising:
  receiving an instruction from either said application or said user to perform a change of communication mode while in the voice mode;
  adding the visual mode to the communication while keeping the voice mode and the visual mode active so as to permit simultaneous communication between the mobile telephone and the application in the voice mode and the visual mode, wherein the voice mode enables the user to receive and transmit audible information and wherein visual mode enables the user to perform at least one of view received information using the visual browser and respond to the received information; and
  synchronizing the visual browser to a state of the voice browser, further comprising the steps of:
    maintaining state information of said voice browser and said visual browser;
    receiving said maintained state information of voice browser at the visual browser; and
    initializing the visual browser to the state of the voice browser;
  whereby the first browser and the second browser are not required to be concurrently in the same updated state in all points in time during communication.

19. The method of claim 18, wherein receiving an instruction from at least one of a user and an application comprises receiving an instruction from at least one of a gateway and an application server.

20. The method of claim 18, further comprising:
  synchronizing the voice browser to the state of visual browser, wherein the visual browser enables interaction with the audible information in the voice mode.

21. The method of claim 18, wherein the instruction is received in response to a difficulty in deciphering the user's speech.

22. A system for mode swapping between a visual mode of communication and a voice mode of communication between a telephone operated by a user and an application, wherein a visual browser conducts said visual mode of communication and a voice browser conducts said voice mode of communication, said system comprising:
  a visual display rendering output from said visual browser;
  a keypad inputting data to said voice browser;

a speaker rendering output from said voice browser and the voice browser accepting inputs from a microphone;

a gateway proxy, further comprising;

a swapping logic for opening and closing said visual mode connection and said voice mode connection in accordance with a mode instruction, wherein said mode instruction can enable any of the following: a voice mode only connection; a visual mode only connection; and a visual first mode and voice mode connection, wherein the visual mode and voice mode connections are synchronized upon an addition of one of the (i) voice mode connection and (ii) the visual mode connection to the simultaneous voice mode and visual mode connection;

a state repository for maintaining information about the state of navigation in the application; and an adaptive mode swapping logic for analyzing current conditions and determining whether to perform a mode swap based on said conditions.

23. A method of swapping between a first mode of communication and a second mode of communication, wherein an application and a user communicate through a telephone in said first and second modes of communication, the communication being in a first mode, wherein a first browser facilitates communication with application in the first mode, and a second browser facilitates communication with application in the second mode, the method comprising:

generating an instruction to perform a change of mode;

adding the second mode to the communication and dropping the first mode from the communication wherein at the instant of adding the second browser, the second browser is not yet synchronized to the state of the first browser;

synchronizing the second browser to a state of the first browser, further comprising the steps of:

maintaining state information of said first browser and said second browser;

receiving said maintained state information of first browser at the second browser; and initializing the second browser to the state of the first browser;

whereby the first browser and the second browser are not required to be concurrently in the same updated state in all points in time during communication.

* * * * *